March 6, 1956 E. E. LYNCH ET AL 2,737,627
DAMPING CIRCUIT FOR DIRECT CURRENT MEASURING INSTRUMENTS
Original Filed July 13, 1948
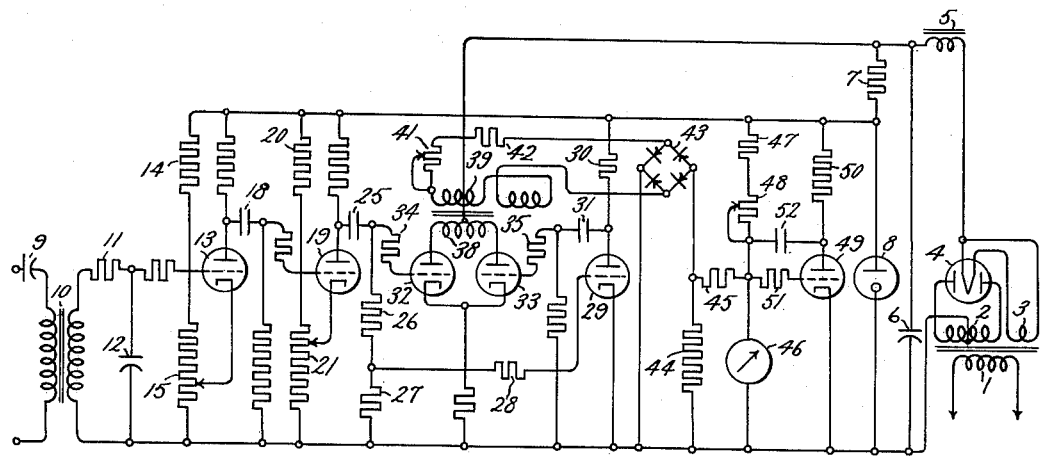
Inventors:
Edward E. Lynch,
Bernard D. Leete.
by Paul A. Frank
Their Attorney.

United States Patent Office 2,737,627
Patented Mar. 6, 1956

2,737,627

DAMPING CIRCUIT FOR DIRECT CURRENT MEASURING INSTRUMENTS

Edward E. Lynch, Wakefield, and Bernard D. Leete, Peabody, Mass., assignors to General Electric Company, a corporation of New York Original application July 13, 1948, Serial No. 38,488. Divided and this application September 12, 1951, Serial No. 246,196

3 Claims. (Cl. 324—125)

This application is a division of our copending application Serial No. 38,488 entitled "Frequency Type Telemeter Receiver," filed July 13, 1948, now Patent No. 2,629,008, issued February 17, 1953, and assigned to the same assignee as the present invention. The invention relates to damping circuits for direct current measuring instruments and has for its object the provision of an improved damping circuit which enables a much smaller damping capacitor to be utilized to obtain the same degree of damping previously obtainable only with a much larger and thus more expensive capacitor.

In our above-mentioned application Serial No. 38,488 there is disclosed a frequency type telemeter receiver adapted to receive a transmitted alternating electric signal of relatively low frequency in the neighborhood of 6 to 27 cycles per second. This telemeter receiver functions to convert the alternating signal to unidirectional pulses of constant amplitude and duration occurring whenever the alternating signal crosses the zero signal axis in either direction, and supplies these pulses to a direct current measuring means responsive to the average value thereof. The damping circuit for a measuring instrument such as may be included in such direct current measuring means comprises the present invention.

The invention may be understood by reference to the following description taken in connection with the accompanying drawing in which the single figure is a schematic circuit diagram of a telemeter receiver embodying the invention.

Referring to the drawing, at the right a transformer has a primary 1 which may be connected to a source of alternating electric current such as the usual 60 cycle electric outlet, and secondaries 2 and 3 connected as shown to a full wave rectifier tube 4. A choke 5 and capacitor 6 constitute a filter for reducing the A.-C. ripple in the rectifier output. This part of the circuit is a conventional D.-C. power supply and may be replaced by any source of direct current voltage of proper magnitude to operate the vacuum tube stages hereinafter described. Resistor 7 and voltage regulator tube 8 further reduce A.-C. ripple and accurately regulate the voltage applied to the vacuum tube anodes.

Capacitor 9 and transformer 10, at the left of Fig. 1 provide coupling means through which an input signal is received from the carrier equipment or other means by which the telemetric signal is conveyed from the transmitter. A lower pass filter comprising an inductor or resistor 11 and a capacitor 12 attenuates audio tones having a frequency above the range in which the telemeter receiver operates. These tones may come, for example, from the carrier equipment, and preferably are eliminated by a low-pass filtering system, such as that shown, to avoid the possibility that they may adversely affect the operation of the receiver.

Vacuum tube 13 and its associated circuit elements constitute a voltage amplifier stage. Resistor 14 and potentiometer 15 supply a fixed bias whereby vacuum tube 13 is negatively biased almost to cut-off, and capacitor 18 is a coupling capacitor for transmitting the A.-C. components of the output signal from vacuum tube 13 to the next amplifier stage.

Vacuum tube 19 and its associated circuit elements constitute a second voltage amplifier stage. Resistors 20 and potentiometer 21 form a voltage divider supplying a negative voltage to bias this vacuum tube far beyond cutoff. Capacitor 25 is a coupling capacitor for transferring the A.-C. components of the output signal from vacuum tube 19 to the following stages. Preferably, vacuum tubes 13 and 19 are both of the sharp cut-off type.

The voltage amplifier stage associated with tube 13 functions to amplify the positive half-cycle and a small portion of the negative half-cycle of a large input voltage signal; small signals being coupled to vacuum tube 19 without substantial distortion. Due to the cut-off bias condition of tube 19 and the shift in signal reference level occurring as the result of the elimination of D.-C. components by coupling capacitor 18, the amplifier stage associated with tube 19 functions to reject small amplitude signals completely and to limit the large amplitude signals to provide a large amplitude signal-responsive output voltage having a substantially rectangular wave form of uniform amplitude. Reference may be had to the above-mentioned application Serial No. 38,488 for a more detailed description of the amplitude limiting action of the amplifier stages associated with tubes 13 and 19.

Resistors 26 and 27 form a voltage divider whereby a part of the output signal from vacuum tube 19 is transmitted through resistor 28 to the grid of vacuum tube 29, which together with load resistor 30 comprises a voltage inverter. Coupling capacitor 31 thus transmits through the following stages a voltage which is 180 degrees out of phase with the voltage transmitted by capacitor 25.

Vacuum tubes 32 and 33 with their associated circuit elements constitute a push-pull amplifier stage. Signals from the preceding stages are applied to the grids of these tubes through resistors 34 and 35 respectively.

A pulse forming transformer has its primary 38 connected between the anodes of tubes 32 and 33. This transformer is of the saturable core type having a magnetic core which saturates with relatively small values of current through the primary. Thus there is induced in secondary 39 a short pulse of voltage each time the polarity of current through primary 38 changes, according to the well known manner of operation of such transformers. These voltage pulses are applied thmrough resistors 41 and 42 to the input of a rectifier 43, preferably of the bridge type as illustrated. The rectified voltage pulses then appear across resistor 44 which is connected between the output terminals of the rectifier bridge.

Resistor 45 and D.-C. milliammeter 46 in series are connected in parallel with resistor 44. The reading of milliammeter 46 is proportional to the average value of the rectifier voltage pulses. Resistor 47 and variable resistor 48 supply a small adjustable bucking current through meter 46 so that the meter can be made to give a zero indication when the voltage pulses have an average value other than zero which represents zero value of the quantity measured by the telemetering system. Meter 46 may be an indicating instrument, a recorder, a control-initiating relay, an electrical system in which the output current is added to other currents for totalizing, or a combination of such instruments. Resistor 45 helps to filter the rectified voltage pulses and thus aids in damping meter 46.

Resistors 48 and 41 are made adjustable as shown to provide means for calibrating the zero and full scale readings respectively of meter 46.

Vacuum tube 49, resistors 45, 50 and 51, and capacitor 52 constitute a damping circuit for meter 46 to prevent undesirably large fluctuations of the meter needle due to A.-C. components of the measured pulses. This damping should be sufficiently great to prevent any undesirable A.-C. fluctuation of the needle of meter 46. In the illustrated circuit, meter 46 is connected in the cathode-to-control grid circuit of tube 49, and capacitor 52 is connected between the grid-connneced side of meter 46 and any connection point, such as the anode of tube 49, in the anode-to-cathode circuit at which an amplifier, phase-inverted replica of the grid signal appears. This damping could be supplied by providing a very large capacitor in parallel with meter 46. However, with the circuits shown, a much smaller capacitor 52 can be employed. Capacitor 52 must charge to a higher voltage, due to the voltage amplification of vacuum tube 49, than would be the case if the capacitor were connected directly in parallel with meter 46. Capacitor 52 thus provides an amount of damping substantially equivalent to that which would be provided by a much larger capacitor connected in parallel with meter 46 and having a capacitance value equal to the capacitance of capacitor 52 multiplied by the voltage gain of vacuum tube 49.

Although we have described above one embodiment of our invention, many modifications can be made, and we intend by the appended claims to cover all such modifications that fall within the true scope and spirit of our invention.

What we claim as new and desire to secure by Letters Patent of the United States is:

1. In combination, means producing an output of electrical signals having alternating current components, a direct current instrument, and means for actuating said instrument with electrical signals which are of substantially the average value of said output signals, comprising a voltage-amplifying vacuum tube having a cathode, anode and control grid, a capacitor coupling said control grid with said anode, a unidirectional voltage supply coupled serially with said cathode and anode, means coupling said instrument in series with said control grid and cathode, and means applying said output signals across said instrument.

2. In combination, means producing an output of periodically-varying substantially unidirectional signals, a direct current instrument, and means for actuating said device with electrical signals which are of substantially the average value of said output signals, comprising a vacuum tube having a cathode, anode and control grid, means coupling said instrument in series relationship with said cathode and control grid, means applying said output signals across said instrument, a cathode-to-anode circuit for said tube including a source of unidirectional voltage and an impedance coupled in series relationship with said cathode and anode for providing a cathode-anode voltage which is an amplified and phase-inverted replica of said output signals, and a capacitor coupling said anode with said control grid.

3. In combination, means producing an output of periodically-varying substantially unidirectional signals, a direct current sensing device, and means for actuating said device with electrical signals which are of substantially the average value of said output signals, comprising a vacuum tube having a cathode, anode and control grid, a load impedance and unidirectional voltage supply coupled in series relationship with said cathode and said anode, a capacitor coupling said anode with said control grid, means applying said output signals across said control grid and cathode, and means coupling said direct current device across said control grid and cathode.

References Cited in the file of this patent

UNITED STATES PATENTS

| 2,179,263 | Koch | Nov. 7, 1939 |
| 2,271,478 | Eldredge | Jan. 27, 1942 |
| 2,412,782 | Palmer | Dec. 17, 1946 |
| 2,629,014 | Edwards | Feb. 17, 1953 |

OTHER REFERENCES

Publication I, Radio and Television News, vol. 48, issue 6, pp. 11 and 20, Dec. 1952.